Figure 1:
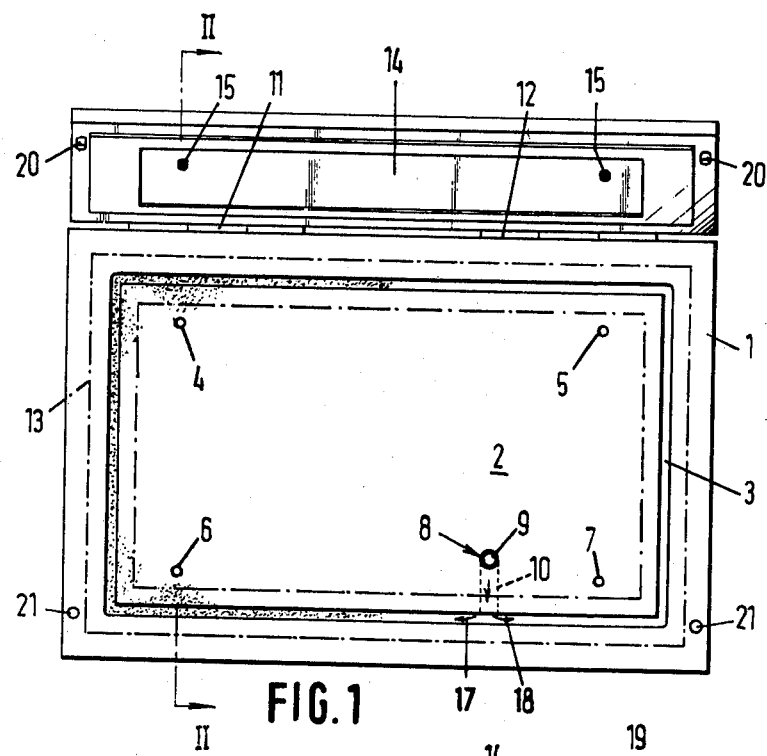

United States Patent [19]

Ockels

[11] 4,284,673
[45] Aug. 18, 1981

[54] METHOD OF MANUFACTURING A PANEL, PROVIDED WITH A FRAME FOAMED OF SYNTHETIC MATERIAL AT LEAST AT ONE LATERAL FACE THEREOF, AS WELL AS A PANEL OBTAINED THROUGH THE METHOD

[75] Inventor: Egbert Ockels, Veendam, Netherlands

[73] Assignee: Markomark B.V., Netherlands

[21] Appl. No.: 46,074

[22] Filed: Jun. 6, 1979

[30] Foreign Application Priority Data

Jun. 9, 1978 [NL] Netherlands ..................... 7806307

[51] Int. Cl.$^3$ .................................. B29D 27/00
[52] U.S. Cl. .................................. 428/54; 264/46.4; 264/46.7; 264/274; 264/328.2; 264/328.12; 264/DIG. 83; 425/110; 425/543; 425/812; 425/817 R; 428/81; 428/314
[58] Field of Search ................. 264/46.4, 46.7, 46.5, 264/DIG. 83, 46.6, 274, 328.2, 328.12; 425/110, 817, 543, 812; 428/54, 81, 314

[56] References Cited

U.S. PATENT DOCUMENTS

| | | | |
|---|---|---|---|
| 3,141,206 | 7/1964 | Stephens | 264/46.4 X |
| 3,183,285 | 5/1965 | Boylan | 264/46.4 |
| 3,258,889 | 7/1966 | Butcher | 264/46.4 X |
| 3,493,449 | 2/1970 | Krug | 264/46.4 X |
| 3,511,906 | 5/1970 | Bergemann et al. | 264/274 X |
| 3,790,421 | 2/1974 | Habgood | 264/109 X |
| 3,880,092 | 4/1975 | Seeber et al. | 264/46.7 X |
| 3,889,353 | 6/1975 | Provi | 264/46.7 X |
| 3,896,199 | 7/1975 | Michaelis | 264/46.5 |
| 3,959,050 | 5/1975 | Hooper | 264/46.5 X |
| 4,028,450 | 6/1977 | Gould | 264/46.4 |
| 4,049,368 | 9/1977 | Grachten | 264/46.5 X |
| 4,072,548 | 2/1978 | Gerson et al. | 264/46.4 X |
| 4,138,283 | 2/1979 | Hanusa | 264/46.7 X |

FOREIGN PATENT DOCUMENTS

| | | | |
|---|---|---|---|
| 78361 | 12/1970 | Fed. Rep. of Germany | 264/46.4 |
| 1945291 | 5/1971 | Fed. Rep. of Germany | 264/46.4 |
| 2139823 | 2/1973 | Fed. Rep. of Germany | 264/46.7 |
| 468535 | 3/1969 | France . | |
| 38-24734 | 11/1963 | Japan | 264/46.6 |
| 548859 | 5/1974 | Switzerland | 264/46.7 |
| 1361385 | 7/1974 | United Kingdom | 264/DIG. 83 |
| 998513 | 7/1975 | United Kingdom | 264/46.4 |

*Primary Examiner*—Philip Anderson
*Attorney, Agent, or Firm*—Steele, Gould & Fried

[57] ABSTRACT

A method of manufacturing a panel, provided with a frame of a synthetic material at least at one side edge face thereof, a laminate composed of a particled board core coated on either side with a coating, with reservation of a molding cavity along the entire or partial panel circumference for the frame to be formed, being applied in the bottom portion of a mold likewise containing a cover portion, after which the mold is closed, while the cover portion is sealingly clamped onto the bottom portion, after which a curing bi-component synthetic material foaming through exothermic reaction is admitted substantially pressure-less into the mold cavity and the panel is removed from the mold after curing, whereby the exothermic reaction of the bi-component synthetic material is utilized for increasing the pressure and the temperature in the molding cavity during the foaming and curing.

9 Claims, 2 Drawing Figures

U.S. Patent Aug. 18, 1981 4,284,673

METHOD OF MANUFACTURING A PANEL, PROVIDED WITH A FRAME FOAMED OF SYNTHETIC MATERIAL AT LEAST AT ONE LATERAL FACE THEREOF, AS WELL AS A PANEL OBTAINED THROUGH THE METHOD

The invention relates to a method of manufacturing a panel provided with a frame of synthetic material at least at one lateral face thereof, a laminate composed of a particled board core coated on either side with a coating, with provision of a mold cavity along the entire or partial panel circumference for the frame to be formed. The core is placed in the bottom portion of a mold having a cover portion, after which the mold is closed, sealingly clamping the cover portion onto the bottom portion, and thereafter there is admitted substantially pressure-less into the mould cavity a curing bi-component synthetic material foaming through exothermic reaction. After curing, the complete panel is removed from the mold.

Such a method is known from Dutch patent No. 136,705. By this method, the adhesion of the frame around the panel at the lateral faces thereof is substantially the result of the general adhesive properties of the synthetic material relative to the material of the panel, and consequently substantially relative to the core thereof. The bonding strength between the frame and the panel is thereby a function of the magnitude of the interface surface. In order to optimize this bonding strength, the interface surface is increased by providing the side edge faces around the panel with a continuous groove, e.g. in the shape of a dovetail. In particular when such panels are processed in furniture, the bonding of the frame to the side edge faces has to meet stringent conditions. Particularly with school furniture, users often apply a cutting device between frame and panel and thus loosen the frame from the panel.

It is the object of the present invention to provide a method providing a panel, within the scope of the above mentioned method, having an improved bonding between frame and panel.

According to the invention the method is characterised in that the exothermic reaction of the bi-component synthetic material is utilized for increasing the pressure and the temperature during the foaming and curing in the mold cavity.

With the method according to the invention it is achieved that the exothermically foaming and curing bi-component synthetic material penetrates into the particled board core. The resultant anchoring of the frame in the depth of the core is basically unlimited, or at least the interface is very enlarged. Furthermore a frame will be realized through the method according to the invention having practically no engagement point in the transition area between frame and panel for loosening the two from each other using a cutting tool, since there is no clear transition between frame and panel.

True, Swiss Pat. No. 468,535 mentions that the material from which the frame is formed, under influence of pressure via a side edge face, can penetrate into the panel so that the eventual frame is likewise anchored in the depth of the core. However, the bonding is the result of the fact that the material providing the frame is injected at high pressure into the mold cavity by means of a high pressure injection machine, in contrast to the method according to the invention, wherein the supply of such material takes place at substantially ambient pressure. In the method according to the invention the pressure need not be higher than that required for overcoming the flow resistance in the mold cavity and for eliminating the air present therein. To this effect a pressure of about 0.1 bars is mostly sufficient. This offers the advantage that in the method according to the invention the supply of the bi-component synthetic material to the mold cavity may be effected by means of a low pressure injection machine. Since these machines are operated at low pressure, the construction thereof is simple. This provides likewise an economic advantage relative to the high pressure injection machines according to the earlier cited Swiss Pat. No. 468,535, the filling pressure of which is a few bars. By the method according to the invention on the one hand the bi-component synthetic material may be advantageously supplied pressure-less or substantially pressure-less to the mold cavity, while on the other hand, through optimal utilization of the properties of this material, a sufficient pressure build-up can be realized for its penetration via a side edge face into the particled board core thereby anchoring the eventually formed frame in the core.

The penetration of the foamed synthetic material via the side edge face of the panel in the core thereof is enhanced when at one side in the panel one or more vents are provided, having a depth that is less than the panel thickness. During the admission of the bi-component synthetic material into the mold cavity, the air available in the mold cavity will thereby migrate via the side edge faces in the core, under influence of the pressure difference between mold cavity and vent, towards the vents, escaping in situ and being discharged outwardly, followed by the foaming and reacting bi-component synthetic material.

For obtaining an optimally regular distribution of the synthetic material penetrated in the panel along the circumference thereof, a uniform positioning of the vents relative to the panel circumference is recommended, together with a maximally uniformly formed mold cavity relative to the panel circumference. In view of the above it is preferred that a vent is positioned in each of the angular regions of the panel and that two of the vents are also utilized as positioning holes for the panel. In general the number of vents to be applied and the position thereof is variable and inter alia a function of the nature of the employed panel and the dimensions thereof, the properties of the foam system used, as well as of the maintained dimensions of the vents, the diameter of which may amount for instance minimally 1.5–2 mm.

By direct supply of the foamable bi-component synthetic material to the mold cavity, there is a chance that disturbances will occur in the structure in the immediate surroundings of the supply point by a more or less strong disturbance of the flow pattern in situ. According to a preferred embodiment of the method according to the invention, the curing bi-component synthetic material foaming through exothermic reaction is indirectly supplied to the moulding cavity via a two-part channel obtained through application of the first channel portion at the side of the panel wherein vents are also incorporated and having a depth that is less than the panel thickness, and a second channel portion connecting the first channel portion to a side edge face. It is advantageous that the first and second channel portions are at right angles to each other, respectively that the first channel portion is right-angled to the side face and the second channel portion to the side edge face. It has furthermore been found advantageous if the second channel portion is coated with a gas-impermeable material, since irrespective of the quieter flow pattern obtained in the mold cavity by injecting the bi-component synthetic material according to the preferred embodiment not directly into the molding cavity, it is nevertheless difficult to avoid that in situ of the mouth of the second channel portion in the mold cavity disturbances in the structure of the eventual frame occur, mostly in the form of a gas bubble. It has been found surprisingly that the occurrence of such disturbances can be practically eliminated if the second channel portion is coated with a gas-impermeable material. Any coating material, for instance glass, steel or another gas-impermeable material in general inert to the bi-component synthetic material may serve.

Since both for the same panel and for different panels small dimensional deviations, e.g. in the panel thickness, cannot be avoided, it is recommended that, after placing the panel in the bottom portion of the mold, the mold cavity be sealed at the cover portion side thereof by means of a synthetic strip, for example, a strip possibly formed to a sealing frame of a flexible synthetic material such as polyurethane, including a synthetic foil, e.g. polyethylene foil. The polyurethane strip has a sealing and panel-compressing function. The polyethylene foil ensures removal of the panel during the opening of the mold.

The reaction that takes place between the two components of the foamable synthetic material is exothermic, and in combination with the blowing agent for the foaming thereof gives rise to pressure increase and temperature increase in the restricted mold cavity. Preferably the number and the position of the vents on application of a chosen foamable bi-component synthetic material is chosen with regard to the pressure to be maintained in the mold cavity by the reaction of the components. As material for the frame of the panel, preferably use is made of so-called polyurethane hard foam. This material finally is cured to form a strip the outer layer of which is substantially solid over a thickness of about 1-2 mm, for the rest having a foam structure. The strip formed from such material, true, is on the one hand not dent-restoring but functions on the other hand adequately as a shock damper. For application of this synthetic material such steps are preferably taken that the number and the position of the vents are chosen relative to the panel circumference for obtaining in the mould cavity a pressure of 500-700 kPa (Kilopascal). For application of a panel with a particled board core there is then obtained a penetration depth of the polyurethane foam material of about 1-2 cm from the side edge faces.

The invention likewise relates to the panels obtained by the method according to the invention.

Figure 2:
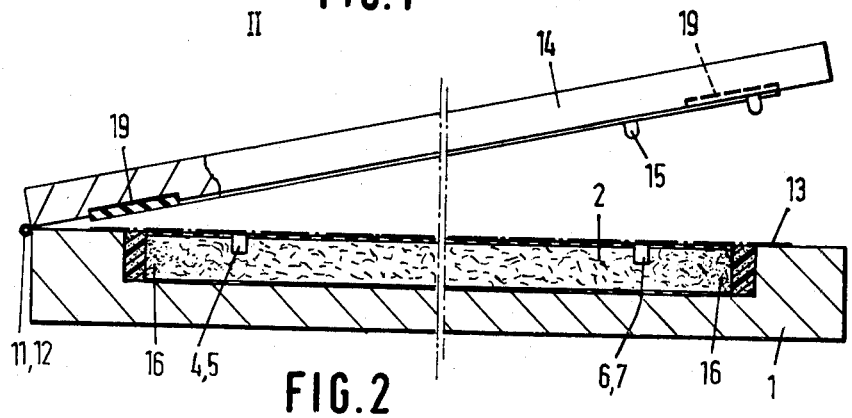

The invention will now be described, by way of example, with reference to the accompanying drawing, wherein FIG. 1 diagrammatically shows a top view of the bottom portion of the mold to be used in the method according to the invention, comprising a panel that is to be provided with a frame, while FIG. 2 is a cross-section on the line II—II in FIG. 1.

The bottom portion of the mould is represented in the drawing by 1 and the panel having a particled board core by 2. In the bottom portion there is provided a recess for accommodating the panel with a reservation along the panel circumference of the frame-molding cavity 3. By 4,5, 6 and 7 are indicated the vents, the channels 6, 7 of which likewise serve as positioning channels for the panel. In the cover portion there are therefor provided at corresponding places cams 15 fitting in the channels 6, 7. Moreover the panel is provided with a channel 8 for supplying the foamable bi-component synthetic material to the mold cavity 3. The channel 8 comprises the first channel portion 9 and right-angled thereto the second channel portion 10 ending in the mold cavity. After the positioning of panel 2 in the mold, the mold cavity is covered by a polyethylene foil 13, after which the cover portion 14, which is connected by pivots 11, 12 to the bottom portion, can be closed, positioned by two fitting pins 20 in apertures 21. The groove 19 provided in the cover portion 14 with elastic strip compresses the polyethylene foil 13.

After closure of the cover portion, the foamable mixture is inserted into the mold cavity via the channel 8. As indicated by arrows 17, 18, the flow of the foamable mixture entering the mold cavity is divided in two sub-flows, the pattern of the right-hand sub-flow in FIG. 1 being further indicated by a hatched line. The air available in the mold cavity migrates through the particled board core in the direction of the vents 4, 5, 6, 7 and is discharged outwardly in a manner not further shown. Upon use of a foamable synthetic material on the basis of polyurethane hard foam, there is advantageously maintained a temperature of about 60° C. in the mold cavity under influence of the exothermic reaction. Together with the gaseous blowing agent, a fluoro-hydrogen chloride compound, there is realized a pressure in the moulding cavity of approximately 600 kPa, leading to a penetration depth of the synthetic hard foam in the particle board core of about 1-2 cm. The pertinent region in the particle board core is indicated by 16.

The covers of the panels which may be provided according to the invention with a frame, may be made of a metal, a synthetic material, resin-impregnated paper, (e.g. melamine resin) natural veneer or veneer impregnated with a synthetic material. The covers may be made of the same material or of different materials.

What I claim is:

1. A method of manufacturing a panel, having a porous particle board core and a frame of foamed synthetic material molded in a cavity formed along at least one side edge of said core, comprising the steps of:
   (a) providing first and second communicating channels in said core, said first channel having a depth less than the panel thickness and said second channel connecting said first channel with said at least one side edge of said core;
   (b) coating said second channel with a gas-impermeable material;
   (c) providing at least one vent in said core, said vent having a depth less than the panel thickness, through which ambient air in said cavity can leave said cavity during molding, migrating first through said porous core itself;
   (d) placing said particle board core into a mold, said cavity being defined along at least that part of the circumference of said core corresponding to said at least one side edge, for forming said frame;
   (e) closing and sealing a cover over said cavity, without sealing said first channel and said at least one vent;
   (f) filling said cavity with a curable bi-component foamable synthetic material through said first and second channels, at low pressure, the formation of bubbles being substantially prevented by said gas impermeable coating, said material foaming through an exothermic reaction, said exothermic reaction sufficiently increasing the pressure and temperature of said foaming material to force said ambient air out of said cavity towards said at least one vent and to force said material to penetrate the interstices of the adjacent sections of said core prior to curing; and, after curing, (g) removing said panel from said mold, said frame material having so penetrated said porous particle board core that said frame is integral therewith and not easily separated therefrom.

2. The method of claim 22, wherein vents are provided in each angular section of said core, and further comprising the step of utilizing two of said vents for positioning said core in said mold.

3. The method of claim 1, wherein said channels are perpendicular to each other, and said second channel is perpendicular to said at least one side edge of said core.

4. The method of claim 1, further comprising the step of placing a strip of synthetic material and a strip of synthetic foil over said cavity and over that portion of said core extending into said cavity prior to closing said cover, for effecting said sealing.

5. The method of claim 1, comprising the step of selecting the number of said vents and the position of said vents, in order to equalize and maintain said pressure caused by said foaming material, in accordance with the characteristics of the particular chosen bi-component synthetic material.

6. The method of claim 5, further comprising the steps of:
utilizing polyurethane hard foam as said bi-component foamable synthetic material; and,
selecting the number of and position for said vents to obtain a molding pressure in the range of 500–700 kPa.

7. The method of claim 1, wherein said core is further provided with a coating on at least one face thereof.

8. The method of claim 1, wherein the molding pressure is permitted to be sufficiently high to cause penetration of the frame material into the core to a depth of 1–2 cm.

9. A panel provided with a frame obtained through application of the method according to claim 1.

* * * * *

UNITED STATES PATENT AND TRADEMARK OFFICE
CERTIFICATE OF CORRECTION

PATENT NO. : 4,284,673
DATED : August 18, 1981
INVENTOR(S) : Egbert Ockels

It is certified that error appears in the above-identified patent and that said Letters Patent are hereby corrected as shown below:

Column 5, line 14: "22" should read --1--.

Signed and Sealed this

Eleventh Day of May 1982

[SEAL]

Attest:

GERALD J. MOSSINGHOFF

Attesting Officer

Commissioner of Patents and Trademarks